United States Patent
Bretzius

(10) Patent No.: US 6,600,278 B1
(45) Date of Patent: Jul. 29, 2003

(54) CLEAN POWER COMMON BUSS VARIABLE FREQUENCY DRIVE SYSTEM

(75) Inventor: Jonathan Bretzius, Fort Washington, PA (US)

(73) Assignee: ABB Inc., Norwalk, CT (US)

( * ) Notice: Subject to any disclaimer, the term of this patent is extended or adjusted under 35 U.S.C. 154(b) by 0 days.

(21) Appl. No.: 10/094,374

(22) Filed: Mar. 8, 2002

(51) Int. Cl.⁷ .............................................. H02P 1/54
(52) U.S. Cl. ........................ 318/34; 318/77; 318/61; 318/71; 318/68; 318/825; 318/802
(58) Field of Search .................... 318/34, 71, 77, 318/61, 48, 755, 432, 58, 434, 801, 805, 802, 376, 68

(56) References Cited

U.S. PATENT DOCUMENTS

| | | | |
|---|---|---|---|
| 3,638,093 A | * | 1/1972 | Ross .......................... 318/687 |
| 4,673,823 A | * | 6/1987 | Tanaka ........................ 307/11 |
| 4,939,431 A | * | 7/1990 | Yamazaki et al. ............ 318/41 |
| 5,203,762 A | | 4/1993 | Cooperstein |
| 5,625,262 A | * | 4/1997 | Lapota ......................... 318/71 |

* cited by examiner

Primary Examiner—Karen Masih
(74) Attorney, Agent, or Firm—Michael M. Rickin

(57) ABSTRACT

A N pulse variable frequency drive for driving two or more motors that is the combination of two or more variable frequency drives with each drive driving an associated one of the two or motors. One application is a decanter centrifuge which has a main motor to drive the bowl and a back motor to drive the conveyor. One of the two variable frequency drives drives the main motor and the other drive drives the back motor. The variable frequency drives are connected to a common buss and to a N pulse phase shifting transformer.

11 Claims, 1 Drawing Sheet

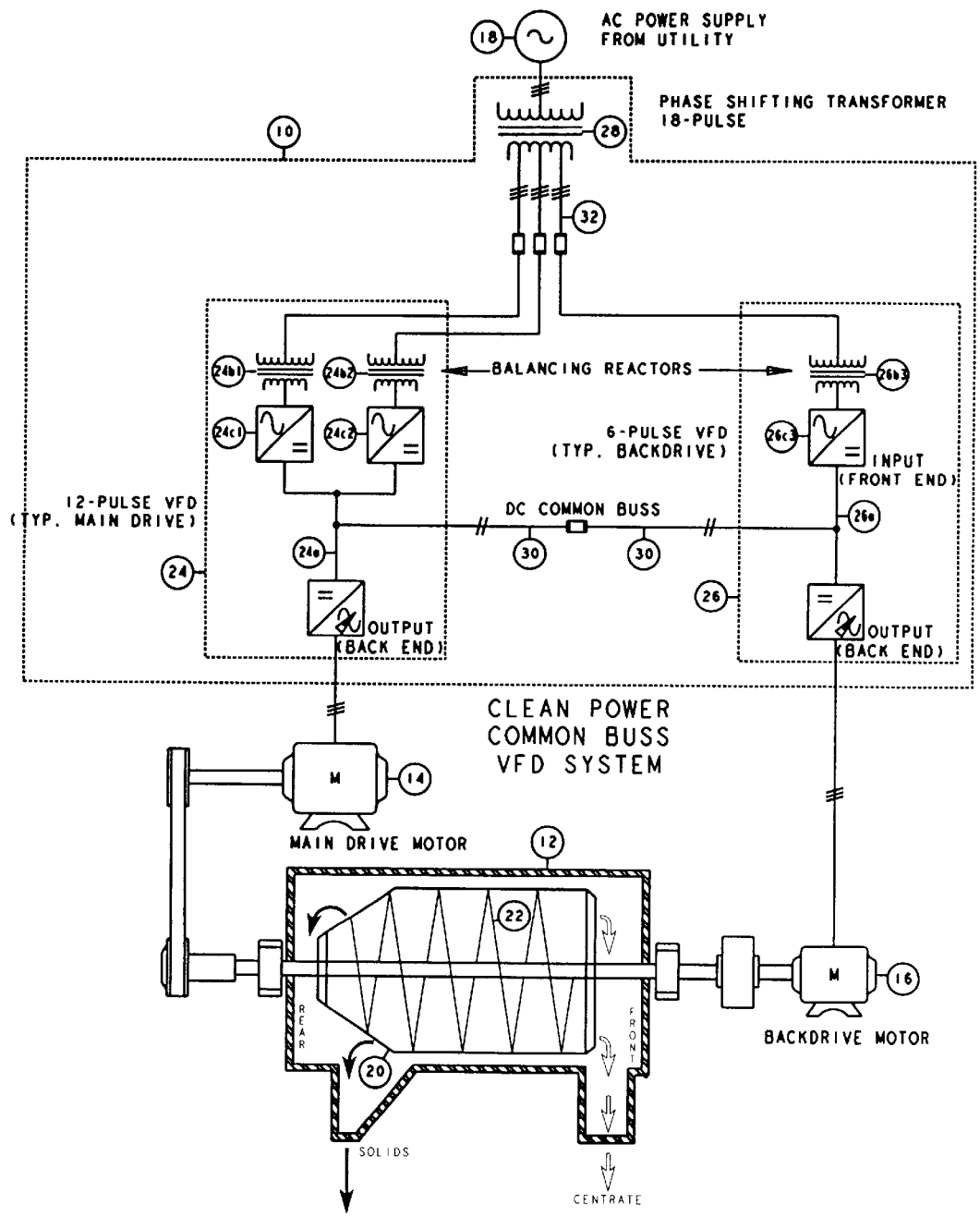

CLEAN POWER COMMON BUSS VARIABLE FREQUENCY DRIVE SYSTEM

1. Field of the Invention

This invention relates to variable frequency drives (VFDs) and more particularly to combining standard VFDs in a manner that reduces the harmonic distortion from levels that occur when standard VFDs are used separately.

2. Description of the Prior Art

VFDs provide variable speed control of motors by converting AC power to DC power and then converting the DC power to variable voltage and frequency AC power. In the conversion process harmonic disturbances are created in the incoming AC power feed. This distortion is proportional to the number of conversion channels or rectifiers (typically diodes) that are used in the VFD. The distortion frequencies are determined by the different harmonics of the AC supply frequency multiplied by:

$$(xn+/-1)$$

where n represents the number of conversion rectifiers and x is taken from 1 to infinity.

In general, the magnitude of each of the harmonic disturbances falls off as n increases. Because of the lower magnitude of disturbances at higher harmonics, IEE519 primarily establishes standards for harmonic disturbances up to the $35^{th}$ harmonic for six pulse drives which are the most common VFDs. The $35^{th}$ harmonic then corresponds to a frequency level of 2100 Hz when the AC supply fundamental frequency is 60 Hz.

As was described above the most common VFDs are six pulse drives. Such drives have six rectifiers, two in each leg of a standard three-phase power line. To further reduce the magnitude of the harmonics and raise the frequency levels of the disturbances, 12-pulse and 18-pulse drives have been developed. These VFDs use phase shifting transformers to create multiple three phase power feeds which are phase shifted allowing the use of a greater number of rectifiers. The benefit of this arrangement is the cancellation of lower order harmonic disturbances. For example, 18-pulse drives would practically eliminate all disturbances below the $17^{th}$ harmonic or 1020 Hz.

One use of VFDs is to simultaneously control multiple motors that are used in decanter type centrifuges. Decanter centrifuges are used in applications such as wastewater treatment to separate a fluid feed mixture into its constituent parts. A decanter centrifuge is typically comprised of a maindrive motor and a backdrive motor and thus has a maindrive VFD and a backdrive VFD. Some decanter backdrive motors act as regenerative devices that require a method for dissipating the regenerative energy produced by the centrifuge process.

As is described in U.S. Pat. No. 5,203,762 the dissipation of the regenerative energy can be achieved by connecting the backdrive VFD to the maindrive VFD through a common DC buss or with a separate DC to AC converter to put energy back unto the AC power line. Although this patent describes a method for recouping the energy of the backdrive motor, it does not address the problem of harmonics disturbances created by the 6-pulse front end. The invention described herein uses features of the common buss VFD and features of the 18-pulse drive system to create a clean power common buss drive system for decanter centrifuges.

SUMMARY OF THE INVENTION

The present invention is a N pulse variable frequency drive for a decanter centrifuge. The centrifuge has a bowl rotatable about its longitudinal axis and a conveyor, a main drive motor for rotating the bowl and a back drive motor for rotating the conveyor. The drive has:

(a) a M1 pulse variable frequency drive connected to the main drive motor;

(b) a M2 pulse variable frequency drive connected to back drive motor;
where M1+M2=N;

(c) a common DC buss connected to the M1 and M2 pulse variable frequency drives; and (d) a N phase shifting transformer connected to the M1 and M2 pulse variable frequency drives.

The present invention is also a N pulse variable frequency drive for driving two or more motors that has:

(a) a M1 pulse variable frequency drive connected to drive the first of the two or more motors;

(b) a M2 pulse variable frequency drive connected to drive the second of the two or more motors;

(c) a common DC buss connected to the M1 and M2 pulse variable frequency drives; and (d) a N phase shifting transformer connected to the M1 and M2 pulse variable frequency drives.

The present invention is also the combination of a decanter centrifuge and a N pulse variable frequency drive. The decanter centrifuge has a bowl rotatable about its longitudinal axis; a conveyor; a main drive motor for rotating the bowl; and a back drive motor for rotating the conveyor. The drive has a M1 pulse variable frequency drive connected to the main drive motor; a M2 pulse variable frequency drive connected to the back drive motor; where M1+M2 N; a common DC buss connected to the M1 and M2 pulse variable frequency drives; a N phase shifting transformer connected to the M1 and M2 pulse variable frequency drives.

The present is further a method for driving a decanter centrifuge using a N pulse variable frequency drive. The centrifuge has a bowl rotatable about its longitudinal axis, a main drive motor for rotating the bowl and a back drive motor for rotating the conveyor, and a conveyor. The method has the steps of:

(a) connecting a M1 pulse variable frequency drive to the main drive motor;

(b) connecting a M2 pulse variable frequency drive to the back drive motor;
where M1+M2=N;

(c) connecting a common buss to the M1 and M2 pulse variable frequency drives; and (d) connecting a N phase shifting transformer to the M1 and M2 pulse variable frequency drives.

DESCRIPTION OF THE DRAWINGS

The only drawing FIGURE shows a diagram of the clean power common buss VFD system of the present invention.

DESCRIPTION OF THE PREFERRED EMBODIMENT(S)

Referring now to the only drawing figure, there is shown the clean power common buss VFD system 10 of the present invention for controlling decanter centrifuge 12. Centrifuge 12 has a main drive motor 14 and a backdrive motor 16. The motors 14 and 16 are electrically connected to an AC power source 18 through the system 10. The main drive motor 14 is adapted in a manner well known to those in the art to drive the bowl 20 of centrifuge 12. The conveyor portion 22 of the centrifuge 12 drives or is driven by backdrive motor 16 in a manner well known to those in the art.

System 10 creates an 18-pulse VFD by using a commercially available 12-pulse VFD maindrive controller 24 with a commercially available 6-pulse VFD backdrive controller 26. Drive 24 has line reactors 24b1 and 24b2 and input (front end) channels 24c1 and 24c2 and drive 26 has line reactor 26b3 and input channel 26c3. The drives 24, 26 are connected together with a DC common buss 30 at section 24a, 26a of each drive. The drives 24, 26 also share a balanced AC power connection 32 from a commercially available 18-pulse phase shifting transformer 28.

To keep the load balanced, each drive rectifier channel in a typical 18-pulse drive must share a balance of the load. Since there are effectively (3) input (front end) channels for an 18-pulse drive, then each channel must carry $\frac{1}{3}^{rd}$ of the total system VFD load. In the case of a 12-pulse and 6-pulse drive system with shared DC common buss 30, each rectifier channel 24c1 & 24c2 for VFD 24 and 26c3 for VFD 26 must carry $\frac{1}{3}$ of the total system demand. This load sharing would result in 66% of the load carried by the 12-pulse drive 24 and 33% of the load carried by the 6-pulse drive 26, a relationship of 2:1 in sizing.

For many applications this sizing relationship would not be achievable because of the required matching of drive sizes to this 2:1 ratio. For example a paper mill might have (2) motors, but they are of equal size (1:1), or a conveyor system might utilize (4) motors of varying sizes depending on the length of each conveyor.

The decanter centrifuge allows standard use of only (2) VFDs 24, 26 that adequately match this 2:1 ratio of loading by the inherent relationship between the maindrive and backdrive horsepower. In some instances it is necessary to over size the backdrive VFD 26 to achieve the balanced 2:1 ratio. Line reactors 24b1 & 24b2 for drive 24 and 26b3 for drive 26 can be used to further fine-tune the current sharing to maintain the proper load sharing in each front end.

The other characteristic of the centrifuge application that makes this arrangement possible is the regenerative nature of some decanter backdrive motors. In the case of regenerative backdrives, the worst-case total system load is calculated when the backdrive is not regenerating. The result is a reduction in the total system load that needs to be supported by the 18-pulse system. This reduced system load allows for an inherent service factor in the standard 12-pulse maindrive front end and/or 6-pulse backdrive as the total system load is as large as the sum of the parts. For example a 300 HP maindrive and a 100 HP Backdrive would only require 300 HP of front end power to support the system as a whole.

The present invention can also be applied to different machinery or systems that require the simultaneous operation of multiple motors. Where only (2) motors are used, such as in the decanter centrifuge 12, the ideal matching is as described above one 12-pulse VFD 24 with one 6-pulse VFD 26 for an 18 pulse system clean power buss system 10. In a paper mill that has three (3) motors of equal size, three (3) 6-pulse drives could be configured in accordance with the present invention to achieve the desired result of improved power quality through reduction of system harmonics.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A N pulse variable frequency drive for a decanter centrifuge of the type having a bowl rotatable about its longitudinal axis and a conveyor, a main drive motor for rotating said bowl and a back drive motor for rotating said conveyor, said drive comprising:
   (a) a M1 pulse variable frequency drive connected to said main drive motor;
   (b) a M2 pulse variable frequency drive connected to back drive motor;
   where M1+M2=N;
   (c) a common DC buss connected to said M1 and M2 pulse variable frequency drives; and
   (d) a N phase shifting transformer connected to said M1 and M2 pulse variable frequency drives.

2. The N pulse variable frequency drive of claim 1 where N is 18, M1 is 12 and M2 is 6.

3. The N pulse variable frequency drive of claim 2 wherein said M1 pulse variable frequency drive has two input channels connected to N phase shifting transformer and said M2 pulse variable frequency drive has one input channel connected to said N phase shifting transformer.

4. A N pulse variable frequency drive for driving two or more motors comprising:
   (a) a M1 pulse variable frequency drive connected to drive the first of said two or more motors;
   (b) a M2 pulse variable frequency drive connected to drive the second of said two or more motors;
   (c) a common DC buss connected to said M1 and M2 pulse variable frequency drives; and
   (d) a N phase shifting transformer connected to said M1 and M2 pulse variable frequency drives.

5. The N pulse variable frequency drive of claim 4 wherein the number of motors is two and M1+M2=N.

6. The N pulse variable frequency drive of claim 4 wherein the number of motors are three and said controller further comprises a M3 pulse variable frequency drive connected to drive said third motor and M1+M2+M3=N.

7. The N pulse variable frequency drive of claim 6 wherein said three motors are of equal size and M1=M2=M3.

8. The N pulse variable frequency drive of claim 4 where N is 18, M1 is 12 and M2 is 6.

9. The N pulse variable frequency drive of claim 6 where N is 18 and M1, M2 and M3 are each equal to 6.

10. In combination:
    (a) a decanter centrifuge comprising:
        a bowl rotatable about its longitudinal axis;
        a conveyor;
        a main drive motor for rotating said bowl; and
        a back drive motor for rotating said conveyor; and
    (b) a N pulse variable frequency drive comprising:
        a M1 pulse variable frequency drive connected to said main drive motor;
        a M2 pulse variable frequency drive connected to said back drive motor;
        where M1+M2=N;
        a common DC buss connected to said M1 and M2 pulse variable frequency drives; and
        a N phase shifting transformer connected to said M1 and M2 pulse variable frequency drives.

11. A method for driving a decanter centrifuge using a N pulse variable frequency drive, said centrifuge having a bowl rotatable about its longitudinal axis, a main drive motor for rotating said bowl and a back drive motor for rotating said conveyor, and a conveyor comprising the steps of:

(a) connecting a M1 pulse variable frequency drive to said main drive motor;

(b) connecting a M2 pulse variable frequency drive to said back drive motor;

where M1+M2=N;

(c) connecting a common buss to said M1 and M2 pulse variable frequency drives; and (d) connecting a N phase shifting transformer to said M1 and M2 pulse variable frequency drives.

\* \* \* \* \*